US010162476B2

(12) United States Patent
Arques et al.

(10) Patent No.: US 10,162,476 B2
(45) Date of Patent: Dec. 25, 2018

(54) COMPUTER-IMPLEMENTED METHOD OF DISPLAYING AN ASSEMBLY OF DIGITALLY MODELED OBJECTS REVEALING HIDDEN OBJECTS

(71) Applicant: Dassault Systemes, Velizy Villacoublay (FR)

(72) Inventors: Nicolas Arques, Nice (FR); Christophe Rene Francis Delfino, Saint Laurent du Var (FR)

(73) Assignee: Dassault Systemes, Velizy Villacoublay (FR)

( * ) Notice: Subject to any disclaimer, the term of this patent is extended or adjusted under 35 U.S.C. 154(b) by 27 days.

(21) Appl. No.: 15/346,930

(22) Filed: Nov. 9, 2016

(65) Prior Publication Data
US 2017/0131866 A1    May 11, 2017

(30) Foreign Application Priority Data
Nov. 10, 2015   (EP) .................................... 15306780

(51) Int. Cl.
*G06T 15/00*     (2011.01)
*G06F 3/0481*    (2013.01)
(Continued)

(52) U.S. Cl.
CPC ...... *G06F 3/04815* (2013.01); *G06F 3/04845* (2013.01); *G06T 15/20* (2013.01);
(Continued)

(58) Field of Classification Search
CPC ..... G06T 17/00; G06T 19/00; G06T 2210/21; G06T 19/20; G06T 15/503;
(Continued)

(56) References Cited

U.S. PATENT DOCUMENTS 9,460,561 B1 * 10/2016 Cote ..................... G06T 19/006
9,841,870 B2 * 12/2017 Hadley ............... G06F 3/04815
9,858,245 B2 *  1/2018 Floyd .................... G06F 17/211

FOREIGN PATENT DOCUMENTS

EP        1 580 674 A2     9/2005

OTHER PUBLICATIONS

Elmqvist N, Assarsson U, Tsigas P. Employing dynamic transparency for 3D occlusion management: Design issues and evaluation. InIFIP Conference on Human-Computer Interaction Sep. 10, 2007 (pp. 532-545). Springer, Berlin, Heidelberg.*
(Continued)

*Primary Examiner* — Phu K Nguyen
(74) *Attorney, Agent, or Firm* — Hamilton, Brook, Smith & Reynolds, P.C.

(57) ABSTRACT

A computer-implemented method displays an assembly of digitally modeled objects in a three-dimensional scene, by the steps of: defining at least one object of the assembly as being revealable; generating a graphical representation of the assembly wherein said revealable object is located at least partially behind at least another object, called hiding object, and displaying said graphical representation; using a graphical tool selecting a region of said graphical representation of the assembly, called a revealing zone; and rendering a three-dimensional scene comprising a three-dimensional representation of the assembly wherein a portion of the revealable object located behind the hiding object and comprised within the revealing zone is shown by transparency through said hiding object. A computer program product, a non-volatile computer-readable data-storage medium and a Computer Aided Design system for carrying out such a method.

14 Claims, 3 Drawing Sheets

(51) Int. Cl.
  *G06F 3/0484* (2013.01)
  *G06T 15/20* (2011.01)
  *G06T 19/20* (2011.01)
  *G06T 15/50* (2011.01)
  *G06T 17/00* (2006.01)
  *G06T 19/00* (2011.01)
  *G06F 3/0482* (2013.01)
  *G09G 5/377* (2006.01)

(52) U.S. Cl.
  CPC ............ *G06T 15/503* (2013.01); *G06T 17/00* (2013.01); *G06T 19/00* (2013.01); *G06T 19/20* (2013.01); *G06F 3/0482* (2013.01); *G06F 2203/04804* (2013.01); *G06T 2210/21* (2013.01); *G09G 5/377* (2013.01)

(58) Field of Classification Search
  CPC ....... G06F 3/04815; G06F 2203/04804; G06F 3/04845; G06F 3/0482; G09G 5/377
  USPC ......................................................... 345/419
  See application file for complete search history.

(56) References Cited

OTHER PUBLICATIONS

Knödel S, Hachet M, Guitton P. Interactive generation and modification of cutaway illustrations for polygonal models. InInternational Symposium on Smart Graphics May 28, 2009 (pp. 140-151). Springer, Berlin, Heidelberg.*

Extended European Search Report for European Application No. EP 15306780.6, titled: A Computer-Implemented Method of Displaying an Assembly of Digitally Modeled Objects Revealing Hidden Objects, Dated: May 20, 2016.

Coffin, C. et al., "Interactive Perspective Cut-away Views for General 3D Scenes," *Proceedings of the 2006 IEEE Symposium on 3D User Interfaces*, Piscataway, NJ, USA, IEEE, Mar. 25, 2006, pp. 25-28.

Li, W. et al., "Interactive Cutaway Illustrations of Complex 3D Models," *ACM Transactions on Graphics*, 26(3): 31-1-31-11 (Jul. 2007).

Pindat, C. et al., "Drilling into Complex 3D Models with Gimlenses," *Proceedings of the ACM Symposium on Virtual Reality Software and Technology*, pp. 223-230 (2013).

* cited by examiner

COMPUTER-IMPLEMENTED METHOD OF DISPLAYING AN ASSEMBLY OF DIGITALLY MODELED OBJECTS REVEALING HIDDEN OBJECTS

RELATED APPLICATION(S)

This application claims priority under 35 U.S.C. § 119 or 365 to Europe, Application No. 15306780.6, filed on Nov. 10, 2015. The entire teachings of the above application(s) are incorporated herein by reference.

FIELD OF THE INVENTION

The invention relates to a method for displaying an assembly of digitally modeled objects wherein selected portions of at least one object, which would otherwise be hidden, are "revealed" by transparency through objects placed before them. The invention also relates to a computer program product, a non-volatile computer-readable data-storage medium and a Computer Aided Design (CAD) system for carrying out such a method.

The invention applies to the field of computer graphics, and more particularly to the field of Computer Aided Design. The invention is particularly suitable for producing technical illustrations, marketing presentations, assembly illustrations, training materials etc.

BACKGROUND

In all the applications above, there is a need of representing assemblies of digitally-modeled objects which show components which are normally hidden inside the assembly. For instance, it may be necessary to provide a representation of a car wherein the engine or other mechanical organs are visible ("revealed") through the body of the car.

In order to obtain this kind of graphical representation, it is known to use three-dimensional (3D) digital models of the assembly and of the hidden parts to be revealed, typically created using CAD software, to generate two-dimensional (2D) images thereof, and then to overlay these images in a 2D computer graphics software, using one or more masks to select the regions of interest, wherein the "hidden" part are revealed. This method is cumbersome and requires significant manual intervention from a user. Moreover, if the point of view from which the assembly is seen is changed, it is necessary to repeat the whole process.

An alternative approach operates directly in 3D, by prioritizing internal objects so that they are visible even when they are located behind other objects. For instance, FIG. 1 shows a graphical representation of a toy car (on the left), and of its transmission (on the right). In a "normal" representation of the car, the transmission is mostly hidden, as it lies behind the body and the front-left wheel of the car. However, the transmission can be identified as taking priority over the body and the wheels, and therefore can be seen by transparency in the final, post-processed image (see FIG. 2). The problem with this approach is that it is not possible to make the transmission visible only through specific regions of the body (or, conversely, to make visible only specific parts of the transmission).

SUMMARY OF THE INVENTION

The invention aims at overcoming these drawbacks of the prior art. More specifically the invention aims at providing a simple and effective method for revealing selected portions of "hidden" components of an assembly of three-dimensionally modeled objects. According to the invention, the method is carried out in 3D, thus allowing changing the point of view easily, and requires minimal human intervention.

According to the invention, this aim is achieved by introducing a graphical tool, called a "revealer", which allows selecting a specific region of the assembly wherein hidden components may be revealed by transparency through other objects located in front of them. An advantageous feature of the invention is that the revealer is a 3D object, which can be moved around, animated and adjusted in real time.

An object of the present invention is then a computer-implemented method of displaying an assembly of digitally modeled objects in a three-dimensional scene, the method comprising the steps of:
a) defining at least one object of the assembly as being revealable;
b) generating, from three-dimensional digital models of the objects, a graphical representation of the assembly as seen from a point of view, wherein said revealable object is located at least partially behind at least another object, called hiding object; and displaying said graphical representation;
c) using a graphical tool for selecting a region of said graphical representation of the assembly, called a revealing zone; and
d) rendering a three-dimensional scene comprising a three-dimensional representation of the assembly as seen from said point of view, wherein a portion of the revealable object located behind the hiding object and comprised within the revealing zone is shown by transparency through said hiding object, while portions of the revealable object located behind the hiding object are not visible.

According to particular embodiments of the invention:
Said step c) may be carried out by using a graphical user interface for creating a graphical tool defined at least by a position, an orientation and an angular opening, the revealing zone being defined by projection of a surface of the graphical tool onto a surface of the hiding object.
More particularly, said graphical tool may be a cone, called revealing cone, intersecting the three-dimensional digital model, the revealing zone being defined by the intersection between the surface of the hiding object and the revealing cone.
Said step b) may comprise generating a said graphical representation of said assembly, and all portions of the revealable object which are located behind the hiding object may then be shown by transparency through said hiding object.
Said step d) may comprise mixing pixels of said revealable object with corresponding pixels of said hiding object.
The objects of the assembly may be arranged in layers and objects belonging to layers other than an outermost one may be at least partially hidden by objects belonging to outer layers.

Another object of the invention is a computer program product, stored on a non-volatile computer-readable data-storage medium, comprising computer-executable instructions to cause a computer system to carry out such a method.

Another object of the invention is a non-volatile computer-readable data-storage medium containing computer-executable instructions to cause a computer system to carry out such a method.

Another object of the invention is a Computer Aided Design system comprising a processor coupled to a memory and a graphical user interface, the memory storing computer-executable instructions to cause the Computer Aided Design system to carry out such a method.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Additional features and advantages of the present invention will become apparent from the subsequent description, taken in conjunction with the accompanying drawings, which show.

DETAILED DESCRIPTION OF THE INVENTION

A description of example embodiments of the invention follows.

Hereafter, a "three-dimensional" (or "3D") object will be an object—or a digital model thereof—allowing a three-dimensional (3D) representation. A 3D representation allows the viewing of the part from all angles. For example, a 3D object, when 3D represented, may be handled and turned around any of its axes, or around any axis in the screen on which the representation is displayed.

Conversely, a "two-dimensional" (or "2D") object will be an object—or a digital model thereof—only allowing a two-dimensional (2D) representation e.g. on a plane. For example, a 2D object may only be translated in the plane of the screen on which the representation is displayed, or rotated around an axis perpendicular to said screen.

A "digital model" of an object is a data structure, or a set of data structures, which can be handled by a computer and contains all the information required by the computer to generate a 2D or 3D representation of the object. The digital model may also contain other items of information, e.g. data representing physical parameters, but they are not required by the present invention.

As discussed above, FIG. 1 shows a graphical representation of a three-dimensional digitally-modeled assembly of objects A—in this case, a toy car—comprising at least two different objects which are rendered separately: a body HO and a transmission RO (represented separately). The objects can be hierarchically organized in layers: the transmission belongs to an inner layer, the body to the outermost one. This means that, by virtue of the geometry of the assembly, the body "takes precedence" over the transmission and, when the two objects are superposed, only the body is visible. The body can then be called a "hiding object", as it "hides" other objects of the assembly which, when seen from a particular point of view, are located behind it. A user, however, may define the transmission RO as being "revealable", i.e. visible even when geometry dictates that it should be hidden. This may be done using a graphical interface, e.g. by locating a mouse pointer onto the representation of the transmission, performing a right click on it and selecting an option "Define as revealable" from a pop-up menu.

Figure 1:
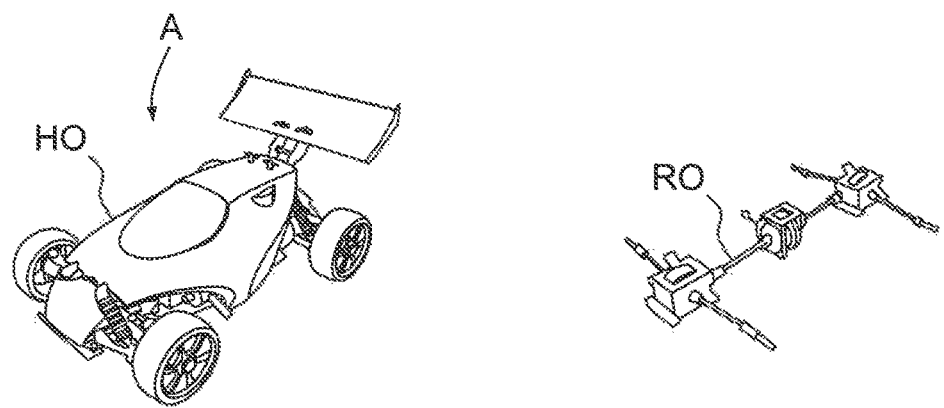
FIG. 1, a step of defining a revealable object of an assembly according to both an embodiment of the invention and the prior art.
Figure 2:
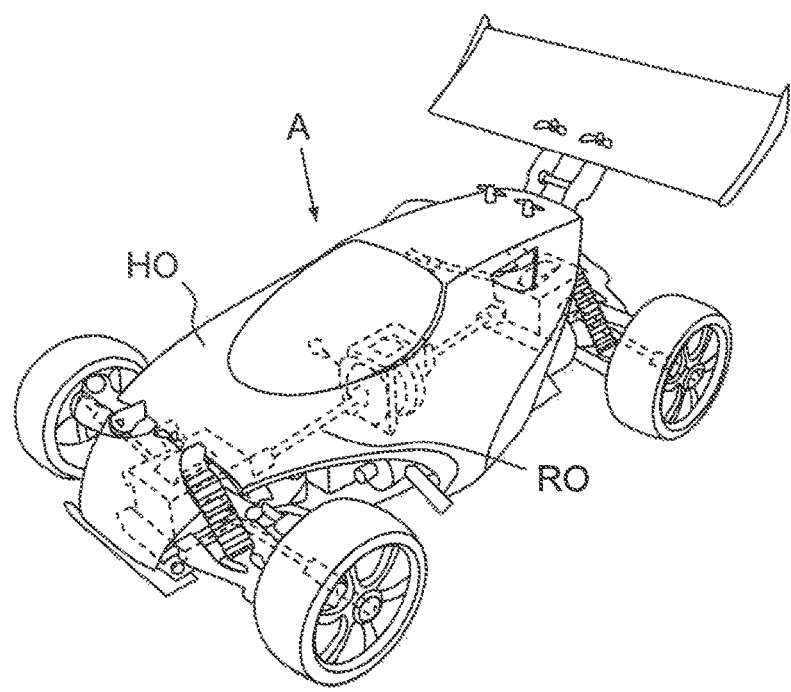
FIG. 2, a step of showing a graphical representation of an assembly of objects wherein both an hiding and a revealable object are visible, according to both an embodiment of the invention and the prior art.

FIG. 2 shows a graphical representation of the assembly A, obtained by combining the two separate representations of FIG. 1. While rendering this representation, the computer takes account of both the "geometrical" and the "user-defined" priorities; as a consequence, the two objects HO, RO belonging to different layers are blended according to predefined (typically user-selectable) weights, called "transparency settings". This mixing may be performed pixel by pixel; it typically involves defining, for each pixel of the final images, luminance and chrominance values given by linear combinations of the corresponding values for the images to be mixed. This does not affect the 3D digital models, but only the 2D image, obtained from said models, which is actually displayed on a computer display.

The result is that the "hidden" object RO is revealed, i.e. is seen as by transparency through the hiding one, HO.

This corresponds to the prior art and, as explained above, is not wholly satisfactory. But, within the framework of the present invention, it only constitutes a preliminary step.

The following step of the inventive method consists in creating a "revealer", which allows selecting a region ("revealing zone") of the assembly wherein the hidden object defined as "revealable" will actually be revealed. This may be performed as illustrated on FIGS. 3A-3D.

First of all (FIG. 3A) a user launches the creation of the revealer, e.g. by positioning a pointer PT on a "revealer creation" button B of a suitable user interface.

Then (FIG. 3B) the user selects—e.g. using the same pointer PT—a point AP1 on the surface of the graphical representation of the assembly A. Advantageously, the point AP1 corresponds to the center of the revealing zone to be defined by the revealer.

Subsequently (FIG. 3C) the user selects a second point AP2 determining the orientation of the revealer RC defining the revealing zone. In the exemplary embodiment of the figures, the revealing RC is a cone and AP2 is its apex, while AP1 corresponds to the intersection of the cone axis and the surface of the assembly A. The point AP2 may be selected by clicking, or by drawing the pointer PT away from AP1 while keeping the left button of the mouse pressed and only releasing it when the pointer is located at the desired location of AP2.

The revealing zone RZ is defined by the intersection between the revealer and the surface of the assembly or, equivalently, by the projection of the outer surface of the revealer onto said surface.

Figure 3A:
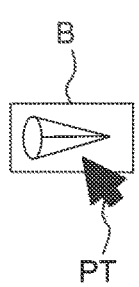
FIGS. 3A-3D, a step of creating a graphical tool for selecting a revealing zone according to an embodiment of the invention.
Figure 3B:
Figure 3C:
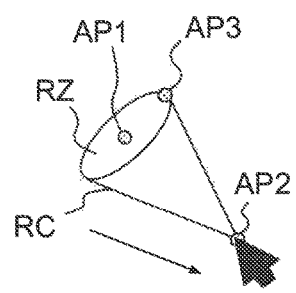
Figure 3D:
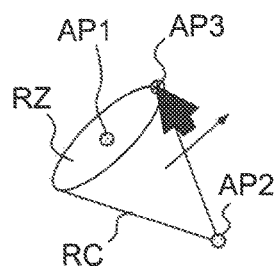

The cone is created with a predetermined angular opening, say 30°, which can be adjusted by moving a third point AP3 which is located on the border of the revealing zone; this allows modifying the size of said zone (FIG. 3D).

The revealer RC is a 3D object whose parameters (position, orientation, angular opening) may be modified interactively using the three "anchor points" AP1, AP2, PA3. Moreover, if the assembly A is moved or rotated, the reveler follows it.

Figure 4:
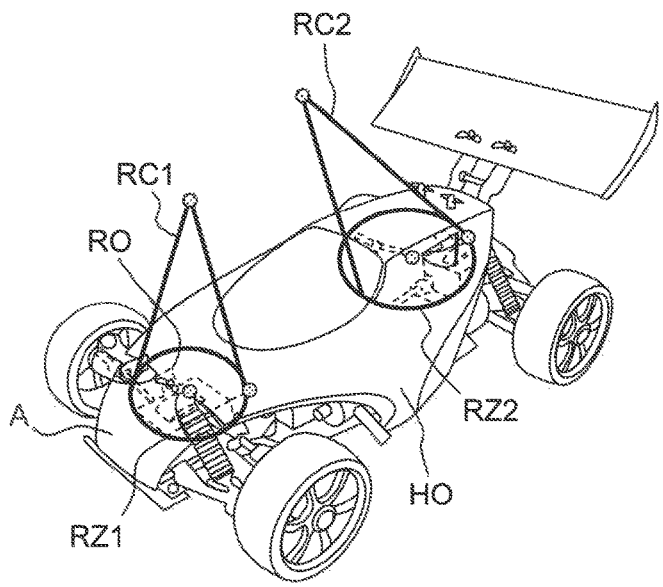
FIG. 4, a graphical representation of the assembly of FIG. 2 obtained by a method according to an embodiment of the invention, wherein the revealable object is revealed by transparency through the hiding object within two revealing zones defined by respective graphical tools.

More than one revealer can be used, for instance two of them (RC1, RC2), defining respective revealing zones (RZ1, RZ2) are represented on FIG. 4.

After that one or more revealer have been created, a computer graphic software is used for rendering a 3D scene representing the assembly, wherein the revealable object RO is revealed (e.g. using the technique discussed above with reference to FIG. 2) only within the revealing zone(s). This is illustrated on FIG. 4. The rendering is performed dynamically, i.e. in real time. It should be noted that some parts of the transmission RO (near the wheels) are visible even if they are outside the revealing zone—simply because they are not hidden by any other object having a higher "geometrical" priority.

The user may have the choice of hiding the revealers or leaving them apparent.

An advantageous feature of the invention is that, if the user moves or rotates the assembly within the scene (or, equivalently, changes the point of view from which the scene is seen), the revealing zones follow automatically these changes.

The inventive method has been described with reference to a particular embodiment, but several alternatives are possible. For instance:

In the embodiment described above, the revealable object RO is initially revealed everywhere and, after the creation of the revealers, the portions outside the revealing zones are hidden. It is also possible to start from a "regular" view of the assembly, showing no transparencies.

The revealers need not be revolution cones (i.e. cones having a circular basis perpendicular to its axis). More generally, they may be cones with a non-circular basis (or, in mathematical terms, directrix); in this case, the number of parameters—and therefore of anchor points—necessarily to define them may be greater than three (e.g. AP3 may be replaced by several anchor points, one for each vertex of a polygonal directrix). Even more generally, a revealer may not be conical at all but have e.g. the shape of a paraboloid.

A conical revealer may only be defined by two parameters instead of three—its height or its angular opening may be fixed. However, this is not preferred.

There are different ways to create a revealer, e.g. by manually entering numerical values for its parameter. However, the graphical approach illustrated by FIGS. 3A-3D is believed to be the most user-friendly.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 5:
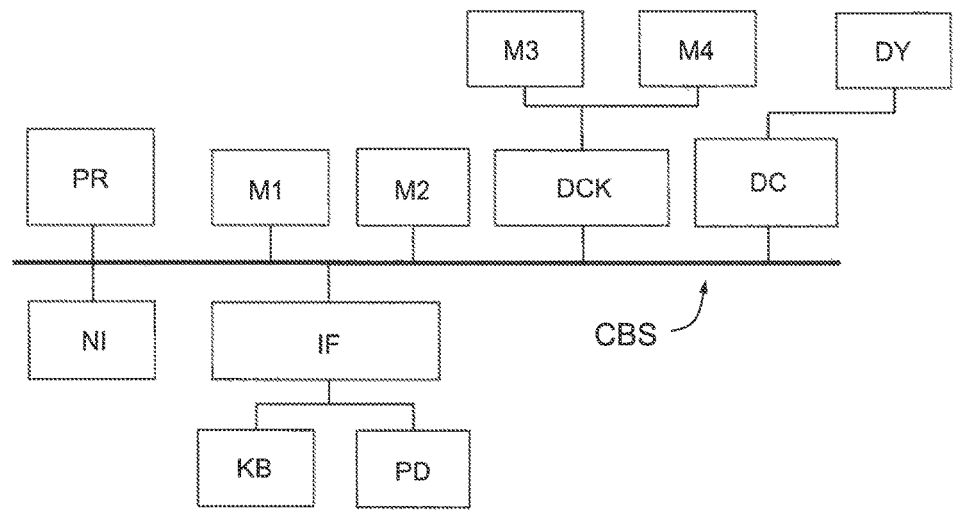
FIGS. 5 and 6, block diagrams of respective computer systems suitable for carrying out a method according to an embodiment of the invention.

A computer—more precisely a Computer Aided Design station—suitable for carrying out a method according to an exemplary embodiment of the present invention is described with reference to FIG. 5. In FIG. 5, the computer includes a Central Processing Unit (CPU) P which performs the processes described above. The process can be stored as an executable program, i.e. a set of computer-readable instructions in memory, such as RAM M1 or ROM M2, or on hard disk drive (HDD) M3, DVD/CD drive M4, or can be stored remotely. Three-dimensional digital models of objects forming an assembly are also stored on one or more of memory devices M1 to M4, or remotely.

The claimed invention is not limited by the form of the computer-readable media on which the computer-readable instructions and/or the digital models of the inventive process are stored. For example, the instructions and databases can be stored on CDs, DVDs, in FLASH memory, RAM, ROM, PROM, EPROM, EEPROM, hard disk or any other information processing device with which the computer aided design station communicates, such as a server or computer. The program and the models can be stored on a same memory device or on different memory devices.

Further, a computer program suitable for carrying out the inventive method can be provided as a utility application, background daemon, or component of an operating system, or combination thereof, executing in conjunction with CPU 800 and an operating system such as Microsoft VISTA, Microsoft Windows 7, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer aided design station in FIG. 5 also includes a network interface NI, such as an Intel Ethernet PRO network interface card from Intel Corporation of America, for interfacing with a network, such as a local area network (LAN), wide area network (WAN), the Internet and the like. The computer aided design station further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface.

Disk controller DKC connects HDD M3 and DVD/CD M4 with communication bus CBS, which can be an ISA, EISA, VESA, PCI, or similar, for interconnecting all of the components of the computer aided design station.

A description of the general features and functionality of the display, keyboard, pointing device, as well as the display controller, disk controller, network interface and I/O interface is omitted herein for brevity as these features are known.

Figure 6:
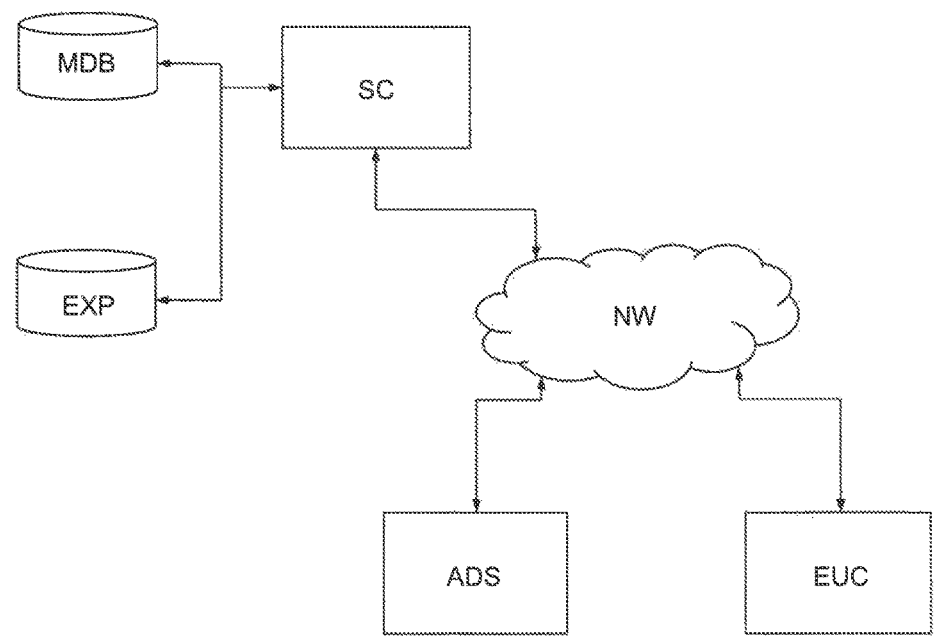

FIG. 6 is a block diagram of a computer system suitable for carrying out a method according to a different exemplary embodiment of the present invention.

In FIG. 6, the executable program EXP and the three-dimensional digital models of the objects are stored on memory devices connected to a server SC. The memory devices and the overall architecture of the server may be the same as discussed above with reference to FIG. 5, except that display controller, display, keyboard and/or pointing device may be missing in the server.

The server SC is then connected to an administrator system ADS and end user computer EUC via a network NW.

The overall architectures of the administrator system and of the end user computer may be the same as discussed above with reference to FIG. 5, except that the memory devices of the administrator system and the end user computer do not store the executable program EXP and/or the three-dimensional digital models. However, the end user computer does store a client program designed for cooperating with the executable program of the server, as it will be discussed below.

As can be appreciated, the network NW can be a public network, such as the Internet, or a private network such as an LAN or WAN network, or any combination thereof and can also include PSTN or ISDN sub-networks. The network NW can also be wired, such as an Ethernet network, or can be wireless such as a cellular network including EDGE, 3G and 4G wireless cellular systems. The wireless network can also be Wi-Fi, Bluetooth, or any other wireless form of communication that is known. Thus, the network NW is merely exemplary and in no way limits the scope of the present advancements.

The client program stored in a memory device of the end user computer and executed by a CPU of the latter accesses, via the network NW, a database MDB stored by the server SC and containing the three-dimensional digital models. This allows an end user to create an assembly of object and to define one or more of them as being revealable. It also allows the end user to parameterize a graphical representation of the assembly (e.g. by setting a point of view) and to create one or more revealers as described above. The server performs the processing as described above, and transmits to the end user computer an image file corresponding to the desired representation of the assembly, again using the network NW.

Although only one administrator system ADS and one end user system EUX are shown, the system can support any number of administrator systems and/or end user systems without limitation. Similarly, multiple servers, model database can also be implemented in the system without departing from the scope of the present invention.

Any processes described herein should be understood as representing modules, segments, or portions of code which include one or more executable instructions for implementing specific logical functions or steps in the process, and alternate implementations are included within the scope of the exemplary embodiment of the present invention.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A computer-implemented method of displaying an assembly (A) of digitally modeled objects (RO, HO) in a three-dimensional scene, the method comprising the steps of:
   a) acquiring an input from a user for defining at least one object (RO) of the assembly as being revealable;
   b) generating, from three-dimensional digital models of the objects, a graphical representation of the assembly as seen from a point of view, wherein said revealable object (RO) is located at least partially behind at least another object (HO), called hiding object; and displaying said graphical representation;
   c) using a graphical tool (RC, RC1, RC2), selecting a region of said graphical representation of the assembly, called a revealing zone (RZ, RZ1, RZ2); and
   d) rendering a three-dimensional scene comprising a three-dimensional representation of the assembly as seen from said point of view, wherein a portion of the revealable object located behind the hiding object and comprised within the revealing zone is shown by transparency through said hiding object, while portions of the revealable object not comprised within the revealing zone located behind the hiding object are not visible, and portions of objects not defined as being revealable and located behind the hiding object, comprised within the revealing zone or not, are not visible.

2. A method according to claim 1 wherein said step c) is carried out by using a graphical user interface (B, PT) for creating a graphical tool (RC) defined at least by a position, an orientation and an angular opening, the revealing zone being defined by projection of a surface of the graphical tool onto a surface of the hiding object.

3. A method according to claim 2 wherein said graphical tool is a cone, called revealing cone, intersecting the three-dimensional digital model and having an apex pointing away from the three-dimensional digital model, the revealing zone being defined by the intersection between the surface of the hiding object and the revealing cone.

4. A method according to claim 1 wherein said step b) comprises generating said graphical representation of said assembly, wherein all portions of the revealable object which are located behind the hiding object are shown by transparency through said hiding object.

5. A method according to claim 1 wherein said step d) comprises mixing pixels of said revealable object with corresponding pixels of said hiding object.

6. A method according to claim 1 wherein the objects of the assembly are arranged in layers; and
   wherein objects belonging to layers other than an outermost one are at least partially hidden by objects belonging to outer layers.

7. A computer program product comprising:
   a non-transitory computer-readable data-storage medium (M1-M4) storing computer-executable instructions to display an assembly (A) of digitally modeled objects (RO, HO) of a three-dimensional scene; and
   the computer-executable instructions including instructions to cause a computer system to:
      a) acquire an input from a user for defining at least one object (RO) of the assembly as being revealable;
      b) generate, from three-dimensional digital models of the objects, a graphical representation of the assembly as seen from a point of view, wherein said revealable object (RO) is located at least partially behind at least another object (HO), called hiding object; and displaying said graphical representation;
      c) use a graphical tool (RC, RC1, RC2) and select a region of said graphical representation of the assembly, called a revealing zone (RZ, RZ1, RZ2); and
      d) render a three-dimensional scene comprising a three-dimensional representation of the assembly as seen from said point of view, wherein a portion of the revealable object located behind the hiding object and comprised within the revealing zone is shown by transparency through said hiding object, while portions of the revealable object not comprised within the revealing zone located behind the hiding object are not visible, and portions of objects not defined as being revealable and located behind the hiding object, comprised within the revealing zone or not, are not visible.

8. A non-transitory computer-readable data-storage medium (M1-M4) comprising:

computer-executable instructions (EXP) to cause a computer system to display an assembly (A) of digitally modeled objects (RO, HO) in a three-dimensional scene, by:
 a) acquiring an input from a user for defining at least one object (RO) of the assembly as being revealable;
 b) generating, from three-dimensional digital models of the objects, a graphical representation of the assembly as seen from a point of view, wherein said revealable object (RO) is located at least partially behind at least another object (HO), called hiding object; and displaying said graphical representation;
 c) using a graphical tool (RC, RC1, RC2), selecting a region of said graphical representation of the assembly, called a revealing zone (RZ, RZ1, RZ2); and
 d) rendering a three-dimensional scene comprising a three-dimensional representation of the assembly as seen from said point of view, wherein a portion of the revealable object located behind the hiding object and comprised within the revealing zone is shown by transparency through said hiding object, while portions of the revealable object not comprised within the revealing zone located behind the hiding object are not visible, and portions of objects not defined as being revealable and located behind the hiding object, comprised within the revealing zone or not, are also not visible.

9. A Computer Aided Design system comprising:
 a processor (P) coupled to a memory (M1-M4) and a graphical user interface (KB, PD, DC, DY);
 the memory storing computer-executable instructions (EXP) to cause the Computer Aided Design system to display an assembly (A) of digitally modeled objects (RO, HO) in a three-dimensional scene by:
 a) acquiring an input from a user for defining at least one object (RO) of the assembly as being revealable;
 b) generating, from three-dimensional digital models of the objects, a graphical representation of the assembly as seen from a point of view, wherein said revealable object (RO) is located at least partially behind at least another object (HO), called hiding object; and displaying said graphical representation;
 c) using a graphical tool (RC, RC1, RC2), selecting a region of said graphical representation of the assembly, called a revealing zone (RZ, RZ1, RZ2); and
 d) rendering a three-dimensional scene comprising a three-dimensional representation of the assembly as seen from said point of view, wherein a portion of the revealable object located behind the hiding object and comprised within the revealing zone is shown by transparency through said hiding object, while portions of the revealable object not comprised within the revealing zone located behind the hiding object are not visible, and portions of objects not defined as being revealable and located behind the hiding object, comprised within the revealing zone or not, are also not visible.

10. The Computer Aided Design system of claim 9 wherein said selecting is carried out by using a graphical user interface (B, PT) for creating a graphical tool (RC) defined at least by a position, an orientation and an angular opening, the revealing zone being defined by projection of a surface of the graphical tool onto a surface of the hiding object.

11. The Computer Aided Design system of claim 10 wherein said graphical tool is a cone, called revealing cone, intersecting the three-dimensional digital model and having an apex pointing away from the three-dimensional model, the revealing zone being defined by the intersection between the surface of the hiding object and the revealing cone.

12. The Computer Aided Design system of claim 9 wherein said generating comprises generating said graphical representation of said assembly, wherein all portions of the revealable object which are located behind the hiding object are shown by transparency through said hiding object.

13. The Computer Aided Design system of claim 9 wherein said rendering comprises mixing pixels of said revealable object with corresponding pixels of said hiding object.

14. The Computer Aided Design system of claim 9 wherein the objects of the assembly are arranged in layers; and
 wherein objects belonging to layers other than an outermost one are at least partially hidden by objects belonging to outer layers.

* * * * *